(12) United States Patent
Zeman et al.

(10) Patent No.: US 10,723,072 B1
(45) Date of Patent: Jul. 28, 2020

(54) ELECTROPHOTOGRAPHIC ADDITIVE MANUFACTURING PROCESS

(71) Applicant: Xactiv, Inc., Fairport, NY (US)

(72) Inventors: Robert Edward Zeman, Webster, NY (US); Peter John Mason, Fairport, NY (US)

(73) Assignee: XACTIV, INC., Fairport, NY (US)

( * ) Notice: Subject to any disclaimer, the term of this patent is extended or adjusted under 35 U.S.C. 154(b) by 159 days.

(21) Appl. No.: 15/849,670

(22) Filed: Dec. 21, 2017

Related U.S. Application Data

(60) Provisional application No. 62/440,487, filed on Dec. 30, 2016.

(51) Int. Cl.
| | | |
|---|---|---|
| *B29C 67/00* | (2017.01) | |
| *B29C 64/153* | (2017.01) | |
| *G03G 9/08* | (2006.01) | |
| *B33Y 70/00* | (2020.01) | |
| *B33Y 30/00* | (2015.01) | |
| *B33Y 10/00* | (2015.01) | |

(52) U.S. Cl.
CPC .............. *B29C 64/153* (2017.08); *G03G 9/08* (2013.01); *B33Y 10/00* (2014.12); *B33Y 30/00* (2014.12); *B33Y 70/00* (2014.12)

(58) Field of Classification Search
CPC ........ B29C 64/153; B33Y 10/00; B33Y 30/00
See application file for complete search history.

(56) References Cited

U.S. PATENT DOCUMENTS

| | | | | |
|---|---|---|---|---|
| 6,206,672 | B1 * | 3/2001 | Grenda .............. | G03G 15/1605 425/174.4 |
| 9,144,940 | B2 * | 9/2015 | Martin .................. | B29C 48/265 |
| 2013/0075022 | A1 * | 3/2013 | Chillscyzn .......... | G03G 15/169 156/230 |
| 2013/0077996 | A1 | 3/2013 | Hanson et al. | |
| 2013/0171431 | A1 * | 7/2013 | Swartz ................ | B32B 37/1284 428/196 |
| 2013/0186549 | A1 * | 7/2013 | Comb .................... | B29C 65/02 156/62.8 |
| 2013/0186558 | A1 * | 7/2013 | Comb .................. | G03G 15/169 156/277 |

(Continued)

OTHER PUBLICATIONS

Office Action dated Mar. 6, 2018 in commonly owned U.S. Appl. No. 14/994,188. EFS File name 20180516_15-849670_IDS_NPL_Cite1.

*Primary Examiner* — Jason L Lazorcik
(74) *Attorney, Agent, or Firm* — John M. Hammond; Patent Innovations LLC

(57) ABSTRACT

An apparatus for fabricating a 3D object. The apparatus may be comprised of a charged powder transferring system, a first charged powder layer generating device, a second charged powder layer generating device, a powder layer consolidation station, and an object build platform. In operation of the apparatus, a portion of a powder transferring surface of the flexible web traverses a directional change member during cyclic motion, and exceeds a radius of curvature defining a delamination threshold between the powder transferring surface and a first fused slice of the object. The apparatus may include an oven operable to fuse a stack of delaminated fused slices on a support substrate into a fused stack comprising fused second powder material and fused first powder material forming at least a portion of the object. A method of fabricating a 3D object is also disclosed.

7 Claims, 2 Drawing Sheets

(56) References Cited

U.S. PATENT DOCUMENTS

| | | | |
|---|---|---|---|
| 2015/0024317 A1* | 1/2015 | Orrock | G03G 9/08771 |
| | | | 430/108.3 |
| 2015/0231825 A1* | 8/2015 | Swartz | B32B 5/26 |
| | | | 428/156 |
| 2016/0082657 A1* | 3/2016 | Swartz | B29C 64/147 |
| | | | 425/110 |
| 2016/0082695 A1* | 3/2016 | Swartz | B29C 70/42 |
| | | | 428/172 |
| 2016/0200084 A1* | 7/2016 | Hays | B33Y 10/00 |
| | | | 156/62.2 |
| 2016/0243764 A1* | 8/2016 | Hays | B33Y 80/00 |
| 2016/0339646 A1* | 11/2016 | Baecker | B29C 64/141 |
| 2017/0151719 A1* | 6/2017 | Swartz | B32B 9/06 |
| 2017/0192377 A1* | 7/2017 | Batchelder | B33Y 30/00 |
| 2017/0291362 A1* | 10/2017 | Tombs | B33Y 10/00 |
| 2017/0299973 A1* | 10/2017 | Frauens | B29C 70/74 |
| 2017/0326797 A1* | 11/2017 | Alvarez | G03G 15/00 |
| 2017/0326805 A1* | 11/2017 | Alvarez | B29C 64/153 |
| 2018/0029300 A1* | 2/2018 | Batchelder | G03G 15/1625 |
| 2018/0126666 A9* | 5/2018 | Swartz | B32B 7/14 |
| 2019/0202125 A1* | 7/2019 | Batchelder | B29C 64/147 |
| 2019/0255767 A1* | 8/2019 | Hays | B29C 64/141 |

\* cited by examiner

ELECTROPHOTOGRAPHIC ADDITIVE MANUFACTURING PROCESS

CROSS-REFERENCE TO RELATED PATENT APPLICATIONS

This application claims the benefit of U.S. Provisional Patent Application No. 62/440,487 filed Dec. 30, 2016, the disclosure of which is incorporated herein by reference. This application is also related to commonly owned copending U.S. patent application Ser. No. 14/994,178, filed on Jan. 13, 2016; U.S. patent application Ser. No. 14/994,180, filed on Jan. 13, 2016; and U.S. patent application Ser. No. 15/050,729, filed on Feb. 23, 2016, the disclosures of which are incorporated herein by reference.

BACKGROUND

Technical Field

Apparatus and methods of fabrication of three-dimensional objects from powder starting materials.

Description of Related Art

This disclosure relates to a process and apparatus for more efficiently manufacturing three-dimensional (3D) objects from powder materials using a digital fabrication method. The 3D manufacturing process, also known as additive manufacturing, rapid prototyping or solid free form, uses digital files that describe cross sections for building the desired part(s) and support structure(s). Various 3D manufacturing methods have been proposed for digitally fabricating a uniquely shaped object on a build platform. Such methods are known generally as "additive manufacturing" methods. In current additive manufacturing methods, the build rate of digitally produced 3D objects produced therefrom is inherently slow since 1) each 2D layer is typically formed by a two dimensional scanning device that rasters along a layer deposition plane and 2) many 2D layers (up to thousands in a high resolution part) are required to produce an object. Furthermore, some manufacturing methods require additional time to post-process a layer before deposition of the next layer. Regardless of the method for building the 3D object, there is a general need to implement process improvements for reducing the time to build uniquely shaped 3D objects.

Various additive manufacturing systems have been proposed to produce three-dimensional objects by selectively depositing, binding or polymerizing raw materials together in layers. The various alternative methods include filament extrusion techniques, ink jetting, selective laser sintering, powder/binder jetting, electron beam melting, and stereolithographic processes. In general, the various methods tend to exhibit a slow build rate. For example, many of the selective deposition methods have a slow build rate since the deposition of the build and support materials is generally provided by a scanning head for extruding or jetting the material for each layer.

3D manufacturing methods based on electrophotography, or xerography, have been proposed. Although it is recognized that the electrophotographic process can enable rapid formation of 2D layers, researchers have reported problems when attempting to produce arbitrarily thick 3D objects when using conventional electrophotography to produce charged powder depositions that are repeatedly electrostatically transferred and heat fused to the object being built. In one instance, it was found that after about 20 transfers, the object surface had many defects and irregularities that compromised the quality of the object.

In addition to the surface defects problem that arises after many electrostatic transfers of charged powder to build an object, when attempting to build an object using an electrophotographic process, the thickness of the object is self-limited for the conventional electrostatic transfer process. When the electrostatic force for transferring charged powder is provided by an electric field due to an electrical bias applied between the conducting substrate of the build object and the ground plane of a powder layer conveying belt or drum, the electric field and correspondingly the applied electrostatic force decreases with increasing thickness of the object. Furthermore, the accumulation of charge on the object due to the charge on the transferred powder creates an electric field that suppresses powder transfer and therefore limits the thickness of the build object and causes irregularities in the surface.

To solve these problems, in commonly owned co-pending U.S. patent application Ser. No. 15/050,729, the disclosure of which is incorporated herein by reference, there is disclosed a solution to the problem, in which a layer or sequence of layers is periodically deposited by a xerographic process onto the build object. This process is continued until the electrostatic deposition efficiency begins to decline. Then, the layers are fused to the object and then a liquid or solid conductive layer is applied to the fused, deposited layer or sequence of layers to create a temporary ground plane to enable restoration of the (next) transfer field, and shield any residual charges in the fused layer. This restoration and shielding enables subsequent efficient electrostatic deposition of one or more additional layers, up until the object is fabricated.

Although this method was technically successful—a 20 mm thick object was fabricated from such sequences of fused powder layers—it is not always desirable or practical to repeatedly render a part conductive during the fabrication process. Also, fusing of the layers became more difficult as the thickness progressed, with the sample needing to be held at elevated temperature until completed. Under such circumstances, unrelieved internal stresses may warp a fabricated object as it cools to ambient temperature.

Although many have attempted to exploit the speed of the xerographic process, most of these attempts have undertaken the approach of building the part in real time, that is, layer-by-layer, as each toned layer is completed. This approach undermines the speed advantage of xerography, because fundamentally the consolidation of the layers into a solid requires a thermal process. Thermal processes are inherently slow; the interpenetration of, for example, ABS molecules between successive layers requires approximately one second at an elevated temperature. Raising the layers to that temperature, then maintaining the temperature, then cooling adds many seconds to each cycle, and, as will be noted below, over 1000 cycles may be required. Furthermore, the part being built must be shuttled back and forth to accept each new layer, again subverting the xerographic process speed capability. For example, U.S. Pat. No. 5,127,037 of Bynum teaches using xerographic means to generate the layers, but then making each layer tacky via induction heating. In another example, U.S. Pat. No. 9,144,940, Martin teaches materials which support a transfusion step, in which each layer is simultaneously transferred and fused to the build object. These thermal steps are very time consuming.

In summary, in currently practiced methods for digitally fabricating 3D objects, the rate for producing 3D objects with such methods is undesirably slow. Accordingly, there remains a need for a high build rate method and apparatus, which can build a three-dimensional part free of defects. There is also a need for a method and apparatus that can build a 3D object that does not have internal thermal stresses and/or dimensional variation due to warpage. Additionally, there is need for a process for fabricating a 3D object, which results in the material of fabrication of the object having a tensile strength that matches the tensile strength of the conventionally cast material.

SUMMARY

In fabrication of an object by a xerographic or other electrically charged powder layer deposition process, the problem of an undesirably slow build rate is solved by temporally separating the generation of the object layers and the consolidation of the object layers. This separation permits the xerographic process to run as fast as technically capable, fabricating object layer after object layer with no interruption for deposition of a conductive layer, electrical discharge, and/or layer-to-object fusing. Then, all of the stacked layers are consolidated simultaneously in a single operation. This separation of layer formation and consolidation steps yields a much higher overall productivity while also keeping the xerographic process simple. Additionally, and advantageously, the resulting object does not have internal thermal stresses and/or dimensional variation which may cause warpage.

In one aspect of the invention, the fast processing speed of xerography is utilized to achieve very high vertical build rates in the field of rapid prototyping. The invention employs electrophotographic and disparate technologies in an innovative way to fully exploit the speed and quality characteristic of and inherent to the xerographic process. In certain embodiments of the method and apparatus, a digital xerographic print engine prints powder images onto a recirculating intermediate transfer belt. These sequential powder images form the "slices" or layers of the 3D part being fabricated.

Color xerographic printing has been practiced for over 30 years. Current xerographic printing machines rival some offset presses in speed and quality. In "full color" xerographic printing, four layers of toner (typically black, and cyan, magenta, and yellow colored powders) are deposited upon a print medium (such as paper), and fused to form a printed image (of text, graphics, photographs, etc.) on the medium. For expanded color gamuts, some xerographic printers form images of between five and nine layers of powders, one layer being black, and the other layers being powders of various primary colors. In an image printing application, particularly on a thin flexible substrate like paper, it is necessary that the toners (i.e., the powders) be small (e.g., particle sizes of 8-12 microns), deposited in very thin layers, and that the toner layers be registered to less than 1 thousandth of an inch, to achieve high quality imagery.

In contrast, in fabrication of 3D objects by an additive manufacturing process, the degree of precision required may be less than that required for high resolution printing, both within the plane of a single object layer, and in the overall thickness of an object layer. Accordingly, in implementing the methods and apparatus of the present disclosure, the toners may be formulated specifically for higher process speed and/or higher thickness layer depositions, in order to take full advantage of the xerographic process deposition rate.

For example, with suitable toner design (e.g., larger sized toner), a "slice" of up to four layers of ABS-based (ABS: acrylonitrile butadiene styrene) toner made via a xerographic process can approach 100 micrometers (μm) in thickness. Instead of transferring this slice from the intermediate belt to a partially formed 3D object being fabricated, the slice may be fused on the belt using a fusing roller. After cooling, the ABS toner slice is stripped from the belt and registration holes that are formed in the slice during exposure of the layers of the slice are engaged with registration pins. In that manner, as many slices are repeatedly made via the xerographic process, the respective registration holes for each slice are always referenced to the imaged part(s) by engagement with the registration pins. (It is noted that an object of 4 inches in height might require a sequence of 1000 stacks.) After all the slices are assembled in sequence to form the "green" unfused 3D object, with each slice being properly registered to the slice above and/or below it, the completed, unfused 3D object is transported to an oven to perform the consolidation of the slices. During the heating and fusing process, a relatively low static pressure may be applied to the top and bottom of the 3D object, which is "baked" until the layers are fused and consolidation is complete. At this point, the part is cooled, and sacrificial toner, as explained below, is removed, resulting in the desired 3D object in final form.

Advantageously, the xerographic process may be operated at process speeds that have been achieved in current, commercial xerographic printing. By also providing the capability to assemble the fused slices on the registration pins at a rate greater than or equal to the rate of fused slice production by the xerographic process, there is thus no reduction in productivity to a level less than the throughput rate of the xerographic process. The ability to assemble the fused slices at process speed and consolidate them in a separate step obviates the need to fuse the individual slices to the object in fabrication as part of the process before proceeding to make another slice. Thus in the method and apparatus of the present disclosure, the rate of material build of a 3D object is the rate of slice formation of the 3D object, which is significantly higher than current xerographic-based 3D object fabrication methods.

For purposes of providing a conservative estimate of 3D object build throughput, it is noted that monochrome xerographic printers have been manufactured to print documents at a rate of up to 200 pages per minute for a standard A4 (210×297 mm) size page. Assuming a 9 inch in-track image length, the xerographic engine in such a printer has a process speed of about 30 inches per second (ips). In the object fabrication applications of the apparatus and methods disclosed herein, the xerographic engines operate under "solid area" printing conditions. Since solid area printing development rates in xerographic engines are slower than rates for typical text printed page densities, in performing hypothetical designs of the apparatus, the Applicants conservatively assume a maximum process speed of 10 ips, or roughly one image frame/sec. It is also noted that commercial color image printers are capable of transferring four layers of toner upon one another at comparable process speeds.

Accordingly, the Applicants have hypothesized that by including four primary (ABS) toner imaging modules and four secondary (support) toner imaging modules in a single apparatus, four layers of toner could be superimposed to form a single slice, which would have a thickness of 0.004 inches (4 mil) on a flexible web before fusing. Thus, a 4 inch high 3D object would require 1000 seconds, or 17 minutes to fabricate. With a continuous throughput oven for performing the consolidation step, once the "pipeline" is filled, 3D objects would be produced at that rate. For comparison, a xerographic process in which each layer, or small sequences of layers must be fused before the next layer or sequence is added to the 3D object in fabrication would require between about 100 and about 150 minutes to fabricate the same 3D object in the above example, assuming very rapid thermal cycling.

In further summary, in accordance with the present disclosure, an apparatus for fabricating a 3D object is provided. In one embodiment, the apparatus is comprised of a charged powder transferring system, a first charged powder layer generating device, a second charged powder layer generating device, a powder layer consolidation station, and an object build platform. The charged powder transferring system comprises an electrically charge-relaxable flexible web coupled to a transfer drive element operable to drive the web in cyclic motion. The first charged powder layer generating device is disposed proximate to the powder transferring system and is operable to dispense a first powder layer upon a first portion of a powder transferring surface of the flexible web. The second charged powder layer generating device is disposed proximate to the powder transferring system and is operable to dispense a second powder material as a second powder layer upon a second portion of the powder transferring surface of the flexible web. The second powder layer includes a first void and a second void. The powder layer consolidation station is operable to fuse the first powder layer and the second powder layer into a first fused slice removably adhered to the powder transferring surface of the flexible web and including the first and second voids. In operation of the apparatus, a portion of the powder transferring surface of the flexible web traverses a directional change member during the cyclic motion of the web. At the directional change member, the flexible web is deformed, and exceeds a radius of curvature defining a delamination threshold between the powder transferring surface and the first fused layer. In certain embodiments, the directional change member may be a roller in rolling contact with the support surface of the flexible web.

The object build platform includes a support substrate, and is operable to receive delaminated fused slices with the first and second voids of the delaminated fused slices engaged with respective first and second receiving pins extending outwardly from the support substrate. The apparatus may include a conveyance robot operable to receive fused slices delaminated from the powder transferring surface of the flexible web upon passage over the directional change member, and convey the delaminated fused slices and engage the first and second voids of the delaminated fused slices with the respective first and second receiving pins of the object build platform.

In certain embodiments, the apparatus includes a squeeze plate operable to compress delaminated fused slices into a stack on the support substrate of the object build platform. In certain embodiments, the apparatus includes an oven operable to fuse a stack of delaminated fused slices on the support substrate into a fused stack comprising fused second powder material and fused first powder material forming at least a portion of the object. The second powder material may be soluble in a solvent. In such embodiments, the apparatus may be further comprised of a dispenser of the solvent operable to dissolve the fused second powder material from the fused stack, with the fused first powder material remaining as at least a portion of the object.

In another embodiment of the present disclosure, the apparatus is comprised of a charged powder transferring system, a first charged powder layer generating device, a powder layer consolidation station, an object build platform, and an oven. The first charged powder layer generating device is disposed proximate to the powder transferring system and is operable to dispense a first powder layer upon a first portion of a powder transferring surface of the flexible web. The powder layer consolidation station is operable to fuse the first powder layer into a first fused slice delaminatable from the powder transferring surface of the flexible web. The object build platform includes a support substrate and is operable to accumulate delaminated fused slices from the powder transferring surface of the flexible web as a stack of fused slices. The oven is operable to fuse the stack on the support substrate into a fused stack comprising fused first powder material forming at least a portion of the object.

In operation of the apparatus, a portion of the powder transferring surface of the flexible web traverses the directional change member during the cyclic motion, and exceeds a radius of curvature defining a delamination threshold between the powder transferring surface and the first fused slice. In certain embodiments, the directional change member may be a roller in rolling contact with the support surface of the flexible web. In certain embodiments, the apparatus may further comprise a squeeze plate operable to compress delaminated fused slices into the stack on the support substrate of the object build platform.

In certain embodiments, the apparatus may further comprise a second charged powder layer generating device disposed proximate to the powder transferring system. The second charged powder layer generating device is operable to dispense a second powder material as a second powder layer upon a second portion of the powder transferring surface of the flexible web. The second powder layer is contiguous with the first perimeter of the first powder layer and includes a first void and a second void. In such embodiments, the object build platform is further comprised of first and second receiving pins extending outwardly from the support substrate, and is operable to receive delaminated fused slices with the first and second voids of the delaminated fused slices engaged with the respective first and second receiving pins.

In certain embodiments, the apparatus may further comprise an optical sensor operable to detect alignment of accumulated delaminated fused slices on the support substrate of the object build platform.

In accordance with the present disclosure, a method for fabricating a 3D object is also provided. The method is comprised of forming a first powder layer upon a powder transferring surface of a flexible web, the first powder layer having a first perimeter; consolidating the first powder layer into a first fused layer removably adhered to the powder transferring surface of the flexible web; moving the powder transferring surface of the flexible web with the first fused layer removably adhered thereto over a web directional change member to deform the powder transferring surface of the flexible web to less than a threshold radius of curvature and cause the first fused layer to delaminate from the powder transferring surface of the flexible web as a first slice of the three dimensional object; conveying the first slice of the three dimensional object to a support substrate of an object build platform; forming a plurality of slices of the three dimensional object and conveying each of the plurality of slices of the three dimensional object to the support substrate to form a stack of slices; and fusing the stack of slices to form at least a portion of the three dimensional object.

The method may further include compressing the plurality of slices to form the stack on the support substrate of the object build platform. In certain embodiments, the first powder layer is formed from a first powder material, and the method comprises forming a second powder layer from a second powder material upon the powder transferring surface contiguous with the first perimeter of the first powder layer. In such embodiments, the second powder layer includes a contiguous region and first and second voids in the contiguous region. The first slice is further comprised of fused second powder material including the first and second voids, and the method includes engaging the first and second voids of the first slice with respective first and second receiving pins extending outwardly from the support substrate.

In certain embodiments, the method further comprises forming a plurality of slices comprised of fused second powder material including the first and second voids, and engaging the first and second voids of each of the plurality of slices with the respective first and second receiving pins. In such embodiments, the method may further comprise compressing the plurality of slices into the stack on the support substrate of the object build platform, and fusing the stack on the support substrate into a fused stack comprising fused second powder material and fused first powder material forming at least a portion of the object. The method may include dissolving the fused second powder material from the fused stack, and retaining the fused first powder material remaining as at least a portion of the object.

BRIEF DESCRIPTION OF THE DRAWINGS

The present disclosure will be provided with reference to the following drawings, in which like numerals refer to like elements, and in which.

Figure 1:
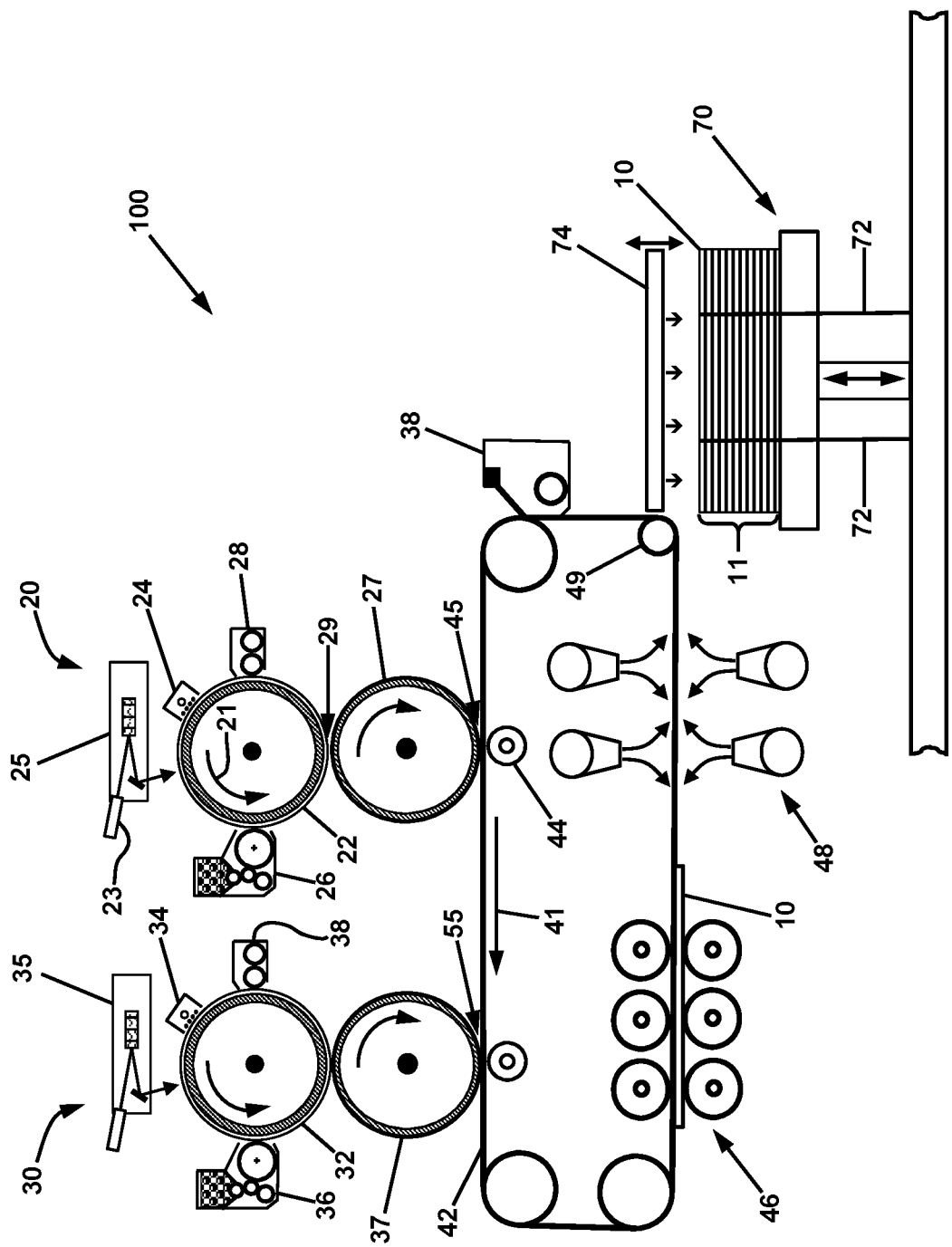
FIG. 1 is a schematic illustration of an apparatus for fabricating a three dimensional object, which apparatus is comprised of a first xerographic imaging engine for forming object layers of primary toner and a second xerographic engine for providing regions of an object layer that contain sacrificial toner.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, certain components may be identified with the adjectives "top," "upper," "bottom," "lower," "left," "right," etc. These adjectives are provided in the context of the orientation of the drawings. However, the description is not to be construed as limiting the invention to use in a particular spatial orientation. The apparatus of the invention may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

As used herein, the term "xerographic engine" or "xerographic module" refers to a collection of components that act cooperatively according to the principles of xerography to form layers of powder that are subsequently consolidated to form a three dimensional object.

As used herein, the term "slice" refers to a single layer that is formed by one or more xerographic engines, and transferred to a web or holding device for subsequent fusing and stacking onto the three dimensional object being built. The term "stack" refers to a sequence of multiple slices. A slice may have only a single powder layer, or a slice may be formed from multiple powder layers deposited from the multiple engines.

As used herein, the term "toner" refers to powder from which a three dimensional (3D) object is formed or powder from which regions are formed for temporarily supporting portions of the object until the object is in final form. The toner material from which the part is to be fabricated is also referred to herein as the "primary" toner. Such materials may include powders of a wide range of polymers including acrylonitrile butadiene styrene (ABS), polyamide, polyimide and others. The toner material used as a temporary structural support for the primary toner is referred to herein as the "secondary" or "support" or "sacrificial" toner. This sacrificial toner is removed after the part fabrication is completed.

As used herein, the term "three dimensional object," as fabricated by the apparatus and methods of the present disclosure, refers to an object that includes at least two layers formed by the apparatus and methods, and fused into a single structure. Such relatively thin three-dimensional objects may be useful as sheet or membrane materials for thin film applications such as filter membranes.

FIG. 1 is a schematic illustration of an apparatus for fabricating a three dimensional object. The apparatus 100 is comprised of a first xerographic imaging engine or module 20 for forming object layers of primary toner and a second xerographic engine or module 30 for providing regions of an object layer that contain sacrificial toner.

The xerographic modules may be similar to conventional xerographic modules as used for xerographic printing of documents. The first xerographic module 20 is comprised of a drum photoconductor 22, a charger 24 for applying an electrical charge to the photoconductor surface, a latent image writer 25, a developing station 26, an intermediate transfer drum 27, and a drum surface cleaner 28. The intermediate transfer drum 27 is in rolling contact with a moving web 42, which receives first powder images from the intermediate transfer drum 27. The second xerographic module 30 is comprised of a drum photoconductor 32, a charger 34, a latent image writer 35, a developing station 36, an intermediate transfer drum 37, and a drum surface cleaner 38. The intermediate transfer drum 37 is also in rolling contact with the moving web 42, which receives second powder images from the intermediate transfer drum 37.

The developing station 26 of the first xerographic module 20 contains primary toner to be used as the material of the 3D object. Accordingly, the first xerographic module 20 is operable to form the portion of a layer of material that will be subsequently consolidated as part of the 3D object. In certain embodiments, the primary toner may be ABS toner.

The developing station 36 of the second xerographic module 30 contains secondary toner to be used as material for supporting portions of the 3D object during fabrication. Accordingly, the second xerographic module 30 is operable to form the support portion of the layer of material that will subsequently be consolidated contiguous with the material of the 3D object, and then removed, leaving only the 3D object. The secondary toner preferably has thermal properties similar to the ABS or other primary toner. In certain embodiments, the secondary toner may be a water soluble toner, made from co-polymers such as PVA-PVP (polyvinyl alcohol-polyvinyl propylene).

In operating the apparatus 100 of FIG. 1 to fabricate a 3D object, or a plurality of 3D objects simultaneously, the xerographic engines 20 and 30 are operated in repeating cycles to produce a sequence of slices of the 3D object or objects, which are transferred to a build platform 70, and subsequently consolidated into the final 3D object or objects, The operation of the apparatus 100 to make a single slice (such as exemplary slice 10 of FIG. 2) will now be described. (It is noted that in the following description, the xerographic engines 20 and 30 are comprised of a rigid drum photoconductors 22 and 32. It is to be understood that such engines 20 and 30 are not limited to having rigid drum photoconductors, and may instead be comprised of flexible belt photoconductors that provide the same functions described herein.)

The xerographic print engine 20 is operated to form the portions 12 of the slice 10 that are cross-sectional slices of the object(s) to be fabricated. As the photoconductor drum 22 is rotated as indicated by arrow 21, charger 24 applies an electrical charge to the surface of the drum 22. The latent image writer 25, comprised of a laser 23 or other light source, "writes" a latent image (not shown) of the object(s) slices on the surface of the drum 22 as it rotates. This latent image is advanced by the rotation 21 past the developing station, which deposits a layer of a first powder material referred to herein as primary toner (not shown) corresponding to the latent image on the surface of the drum 22. This primary toner image is advanced to the nip 29, where contact between the drum 22 and the intermediate transfer drum 27 results in the transfer of the primary toner image, or nearly the entire primary toner image, to the transfer drum 27. (Any remaining traces of primary toner of the image are subsequently cleaned from the surface of the drum 22, and/or electrically discharged during rotation past the surface cleaner 28.) The primary toner image is then transferred to the flexible belt or web 42, which is being operated in continuous cycling motion as indicated by arrow 41. Such motion conveys the primary toner image to the nip 45 between the transfer drum 27 of the first xerographic engine 20 and the flexible belt or web 42.

In like manner, the xerographic print engine 30 is operated to form the portions 14 of the slice 10 (see FIG. 2) that are cross-sectional slices of the a second powder material referred to herein as secondary toner that is not part of the object(s) to be fabricated, and that is to subsequently be removed from the consolidated stack to produce the final 3D object(s). The details of the operation of the xerographic engine 30 are analogous to those described above, and thus will not be recited here. The xerographic engine 30 is operated synchronously with the engine 20, with the net result of the operation of xerographic engine 30 being that a powder image of secondary toner is conveyed on the transfer drum 37 to the nip. This secondary toner image arrives concurrently and in registration at the nip 55 with the primary toner image arriving at the nip 55 as described above. The secondary toner image is contiguous with the perimeter of the primary toner image. The toner images may be transferred by electrostatic transfer, as is practiced in conventional xerographic document printing. In certain embodiments, the electrostatic transfer voltages may be optimized dependent upon the dielectric thickness of previously deposited toner layers. With regard to the flexible web 42, the web material should be dimensionally and thermally stable under the ambient operating conditions, and preferably will have a conducting surface that is electrically grounded. The conductive surface may be provided by a metal coating formed upon the flexible web 42. The flexible web may also include a low surface energy coating. In experimental trails, aluminized Mylar® (polyethylene terephthalate) has been demonstrated as being suitable. Additionally, aluminized Kapton® (polyimide) may be preferable for its greater thermal stability.

The primary and secondary toner images emerge from the nip 55 in registration, and form the total powder image that is to be fused to form a slice of the object(s) to be fabricated. This unfused primary and secondary toner image is conveyed to a powder layer consolidation station 46, also referred to as a fusing station 46, typically comprised of heated compression rollers, where it is fused to form the slice 10 that is to be consolidated with other slices similarly fabricated by the apparatus 100. In embodiments in which the primary toner is ABS toner, this operation may require higher temperatures than conventional xerographic toners used for document printing, since ABS melts at approximately 105° C. Additionally, it is preferable that the surfaces of the fusing rollers contacting the toner be very smooth, thereby imparting a glossy finish to the surface of the slice 10. The smooth slice surfaces reduce the amount of air between the stacked slices, improving intimate contact and consolidation.

After fusing, the slice 10 is conveyed through a cooling station 48 and then the portion of the web 42 that is conveying the slice 10 is passed over a directional change member 49. The slice is "delaminatable," i.e., capable of being delaminated, from the web 42. Accordingly, at the directional change member 49, the flexible web 42 is deformed, and exceeds a radius of curvature defining a delamination threshold between the powder transferring surface and the first fused layer. In certain embodiments, the directional change member may be a roller 49 having a small radius compared to the lengthwise dimension of the slice 10. This relatively sharp flexing of the web 42 around the roller 49, in combination with the high stiffness of the ABS material in the slice 10 and the low surface energy of the web, causes the slice 10 to be delaminated from the web 42. In certain embodiments, the roller 49 has a diameter of less than 1 inch. In another embodiment (not shown), instead of using a roller 49, a solid bar of material may be used, having an edge, or a surface with a small radius of curvature in contact with a support surface opposed to powder transferring surface of the web 42. In either the instance of using a roller 49, or using a bar (not shown), the operative principle is that the roller or bar is a directional change member 49 supporting the flexible web such that when a portion of the powder transferring surface of the flexible web traverses the directional change member 49, the web is bent, and exceeds a radius of curvature defining a delamination threshold between the powder transferring surface of the web and a first fused layer. In that manner, when a fused layer passes over the directional change member 49, it is delaminated from the web 42 as a slice 10, and can then be conveyed to the object build platform 70.

Figure 2:
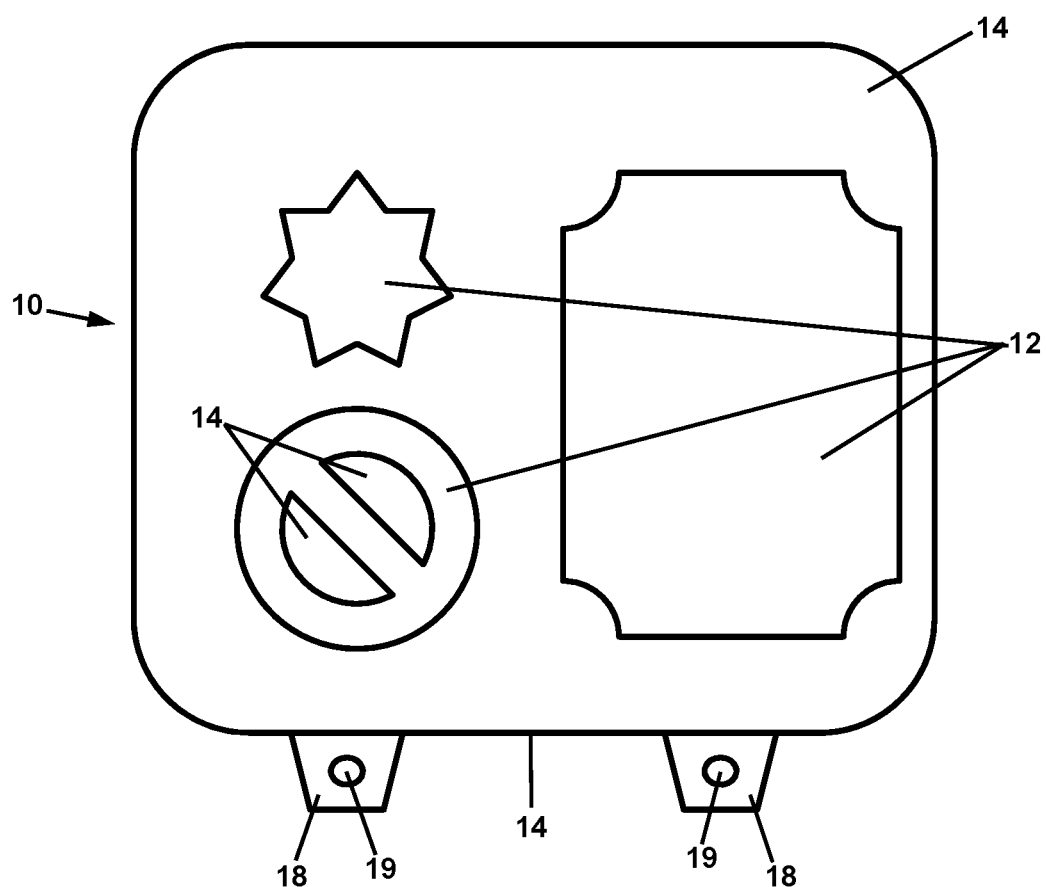
FIG. 2 is a top view of an exemplary slice or layer of an object made by the apparatus of the present disclosure.

FIG. 2 is a detailed top view of a slice 10 comprised of regions 12 of fused primary toner that form portions of a plurality of 3D objects to be fabricated, and regions 14 of fused secondary toner that are removed after consolidation of all of the slices 10 that are formed by the apparatus 100. The slice 10 as produced by the apparatus 100 may have a thickness of between 10 and 150 microns. The regions 14 of fused secondary toner may include at least two ears 18, which are provided with registration holes or voids 19 therethrough. The registration holes 19 result from there being corresponding first and second voids present when the layer of secondary toner is deposited and fused as described previously. Referring again also to FIG. 1, when a slice 10 is detached from the web 42 as described above, it is then disposed upon a build platform 70, or on previously fabricated slices 10 that are disposed upon the build platform 70. The build platform 70 is comprised of vertically extending registration pins 72, which are separated from each other by a distance equal to the separation distance between the registration holes 19 of the slices 10. Accordingly, each of the slices 10 are disposed upon the build platform 70 (in the case of the first fabricated slice 10) and/or the stack of slices 10 upon the build platform 70, with the registration holes 19 thereof engaged with the registration pins 72 of the platform. In that manner, all of the slices 10 are stacked in registration. (It is again noted that the slice 10 of FIG. 20 is a single exemplary slice, and that other slices 10 will have varying shapes of the primary toner regions 12 and secondary toner regions 14 in order to enable the fabrication of 3D objects having complex shapes.)

In certain embodiments, the slices that are delaminated from the belt 42 may be conveyed to the build platform 70 and engaged with the registration pins 72 by a robot (not shown). The robot is configured to transport relatively thin layers of material in a manner so as to not cause any fracture or other damage to the thin layers. In one embodiment, the robot may be wafer conveying robot such as is used to transport semiconductor wafers during the fabrication of integrated circuit chips. The robot is operable to receive a slice 10 delaminated from the belt 42, and convey the slice 10 to the build platform 70 and engage the registration holes 19 with the registration pins 72. The robot may use grasping fingers and/or vacuum griping, or other suitable gripping techniques known in the art for conveying delicate wafer-like sheets of material(s). Additionally, the registration pins 72 may be provided at locations other than depicted in FIG. 1, which is to be considered exemplary. The registration pins may be provided in pairs on one side of the platform 70, or on opposed sides of the platform 70, or on adjacent sides of the platform 70. Additionally, in the event that the rate of production of delaminated slices is greater than the rate at which a robot or other slice transferring components can move the slices and engage them with the pins 72 of the build platform, multiple robots that alternate in performing this function may be provided.

To compensate for the increasing thickness of the stack 11 of the slices 10, the platform 70 may be lowered as the slices 10 are stacked. A cushioned squeeze-plate 74 may be used to push each slice 10 into intimate contact with the previous slice 10 of the stack 11, thereby removing entrained air between the slices. Once all of the slices 10 have been fabricated and added to the stack 11, and the stack 11 is complete, it is pressed from the bottom by the build platform 70, and from the top by the cushioned squeeze-plate 74 or by a rigid plate (not shown) to a specified pressure. The compressed stack may then be transported to and inserted into an oven (not shown). After baking of the compressed stack to consolidate all of the slices into a monolithic block of fused sacrificial toner and fused primary toner that form the 3D object(s) of the block, the consolidated block is removed from the oven and cooled. (Such "baking" of a block of a compressed stack is described in further detail subsequently in this specification.) The sacrificial toner of the block is then removed by dissolution in a suitable solvent, and the 3D object(s) formed within the block are revealed.

It is noted that with effective design of the conveying equipment to receive fused slices 10 from the cooling station 48 and transfer then to the build platform 70, and with effective design of the oven, the total throughput of the method of fabrication using the apparatus 100 is not limited by the speed of the conveying equipment or the speed of the oven consolidating blocks. Thus the throughput of the apparatus 100 may be as fast as the xerographic engines 20 and 30 can generate the powder layers of primary and secondary toner to be fused into slices. This is a very high throughput rate as compared to conventional additive manufacturing methods and apparatus for making 3D objects. In certain embodiments, the rate of vertical build of the object, which is a standard metric in additive manufacturing, is at least about one inch of a stack build in 17 minutes.

Suitable methods for achieving registration of slices to be consolidated at a desired high throughput include pin registration and optical registration. Pin registration has the advantage of keeping all of the fabricated slices in registration throughout the build process. As depicted in FIG. 1 and described above, the registration pins 72 keep the slices 10 registered. After the final slice 10 is deposited on the stack 11 and the finished stack is clamped, the registration pins 72 may be retracted from the stack 11, or the stack 11 raised to disengage with the pins 72. The registration pins 72 may be provided with tapered tops, so that only a coarse initial registration is needed to engage a slice 10 with the pins 72. Additionally, light air pressure may be provided from underneath the slice to cause it to float with lateral freedom of motion. In that manner, the slice 10 can self-center on the pins 72 as it is pressed down by the cushioned squeeze-plate 74.

Optical registration may take varied approaches. In certain embodiments, registration marks may be generated during exposure if the primary and secondary toners have differing optical spectra that can be read by an optical sensor as the slice 10 is added to the stack 11. This information may then be used to position and hold the sample (using, e.g., two alternating clamps) in registration. In other embodiments, "pure" image analysis can be used, in which an image analyzer knows a priori the position of the portions 12 of primary toner in each slice 10 (since this is defined for the exposure subsystem) and, for example, reading the primary toner image position through a transparent suction plate (like plate 74, but not shown) that holds the newly completed slice, and places it in registration upon the previous slice. These slices may then be tacked to one another, using momentary contact with a hot tip (akin to a soldering tip) in the secondary toner area, to maintain registration during the build process without pins Additionally, differences in the optical properties of the primary and secondary toners may be utilized to simply impart sequence information on each slice, and the slices may be accumulated and removed from the machine, to be registered and consolidated at a different time and location on a separate device, using a priori registration information.

The method and apparatus may be used to fabricate objects from slices in which imaged voids are small and distributed over most or all of the area of the slice. These voids may be sufficiently small so as to form pores in a slice. Two or more slices may be fused to form a sheet or block of material that is suitable to operate as a filter membrane. In certain embodiments, the voids may form pores having sizes between 10 and 50 microns. Other void sizes resulting in other filter pore sizes are contemplated.

EXAMPLES

The Applicants have demonstrated 100 micron (4 mil) slice generation, slice fusing, and delamination of slices from a web in a prototype object fabrication laboratory apparatus. Fusing of the slices produced by the prototype apparatus has also been accomplished, albeit at a slower speed than the output of commercial xerographic engines because the prototype fusing module included only one heated roller. It is projected that with a more effective fusing module, fusing at speed that matches commercial xerographic engines' output, i.e., 10 inches per second, will be feasible. Assuming four primary toner engine modules and four sacrificial toner engines modules, overall projected build rates of such an apparatus that forms slices having a 4-mil thickness are 14.4 vertical inches of object build per hour, and for an apparatus that forms slices having a 1-mil thickness, such as depicted in the incorporated drawings, 3.6 inches per hour.

With regard to consolidation of the stack of slices by applying pressure and "baking," i.e., heating for a specified period of time, experimental trials have been performed in which one inch of stacked slices of ABS were subjected to light pressure of between 6-10 psi applied to the top and bottom of a stack. The compressed stack was placed in an oven operating between 120° C. and 150° C. (The Applicants have found that the optimum oven temperature and baking time to achieve full consolidation of the stack will depend upon the toner materials properties.) Under these pressure and temperature conditions, the ABS toner material required about one hour to reach the oven set temperature, after which the block may be cooled. Adequate cooling obtained by normal room temperature convection after removal from the oven required about one-half hour. Active cooling, such as by forced air convection, should reduce this time.

In three separate trials, samples were generated by the method described herein and oven heated at slightly differing temperatures. Commercially cast ABS was also obtained and included in the sample set, which was tested for tensile strength via ASTM D638 Type 5 procedures. The average tensile strength of the commercially cast samples was 5082 psi. The average tensile strength of the Applicants' samples was 4996 psi. One of the experimentally generated samples achieved 5392 psi. Thus, the Applicants believe the consolidation method is sound.

It is therefore apparent that there has been provided, in accordance with the present disclosure, an apparatus and methods of fabrication of three-dimensional objects from powder starting materials. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As referred to herein, all compositional percentages are by weight of the total composition, unless otherwise specified. As used herein, the words "comprise," "include," contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the composition of a conduit: a conduit consisting essentially of carbon steel means there may be a minor portions or trace amounts of metals, oxides, and other chemical species that are noble metals, such chromium, platinum, and the like, and a conduit consisting essentially of noble metal may have trace amounts of iron, iron oxides, carbon, and other metal oxides. An example of "consisting of" may be a burner made up of components that are one or more carbon steels and no noble metals or ceramic materials, or conduits made up of only noble metals. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. An example of methods and systems using the transition phrase "consisting of" includes those where only burners having liquid-cooled jackets are used, with no gas-cooled jackets, or vice versa. The term "comprising" and derivatives thereof is not intended to exclude the presence of any additional component, step or procedure, whether or not the same is disclosed herein. In order to avoid any doubt, all compositions, apparatus, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k*(RU-RL)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. An apparatus for fabricating an object, the apparatus comprising:
   a) a charged powder transferring system comprising an electrically charge-relaxable flexible web comprised of a powder transferring surface, the flexible web coupled to a transfer drive element operable to drive the web in cyclic motion around a plurality of support members in contact with the web;

b) a first charged powder layer generating device disposed proximate to a first portion of the powder transferring surface of the flexible web at a first location;

c) directional change member comprising a contact surface in contact with a support surface of the flexible web opposed to the powder transferring surface of the flexible web; and d) an object build platform comprising a support substrate;

wherein the first portion of the web is movable around at least one of the plurality of support members to a second location, the first portion of the web then being disposed at the second location in a substantially horizontal plane and in contact with the contact surface of the directional change member; and wherein the first portion of the web is movable from the second location, deforming while traversing over the contact surface of the directional change member to a third location, the first portion of the web then being at the third location directionally changed and disposed in a substantially vertical plane with respect to the substantially horizontal plane of the second location, and in contact with the contact surface of the directional change member; and wherein the object build platform is in a fixed position laterally beyond the second location of the first portion of the web and laterally beyond the directional change member while the first portion of the web is traversed over the directional change member from the second location to the third location.

2. The apparatus of claim 1, wherein the directional change member is a roller in rolling contact with the support surface of the flexible web.

3. The apparatus of claim 2, wherein the roller has a diameter of less than 1 inch.

4. The apparatus of claim 1, wherein the directional change member is a solid bar.

5. The apparatus of claim 1, wherein the first portion of the web is movable to a powder layer consolidation station at a fourth location located between the first location and the second location.

6. The apparatus of claim 1, further comprising a second charged powder layer generating device disposed proximate to the first location.

7. The apparatus of claim 6, wherein the first portion of the web is movable to a powder layer consolidation station at a fourth location located between the first location and the second location.

* * * * *